UNITED STATES PATENT OFFICE.

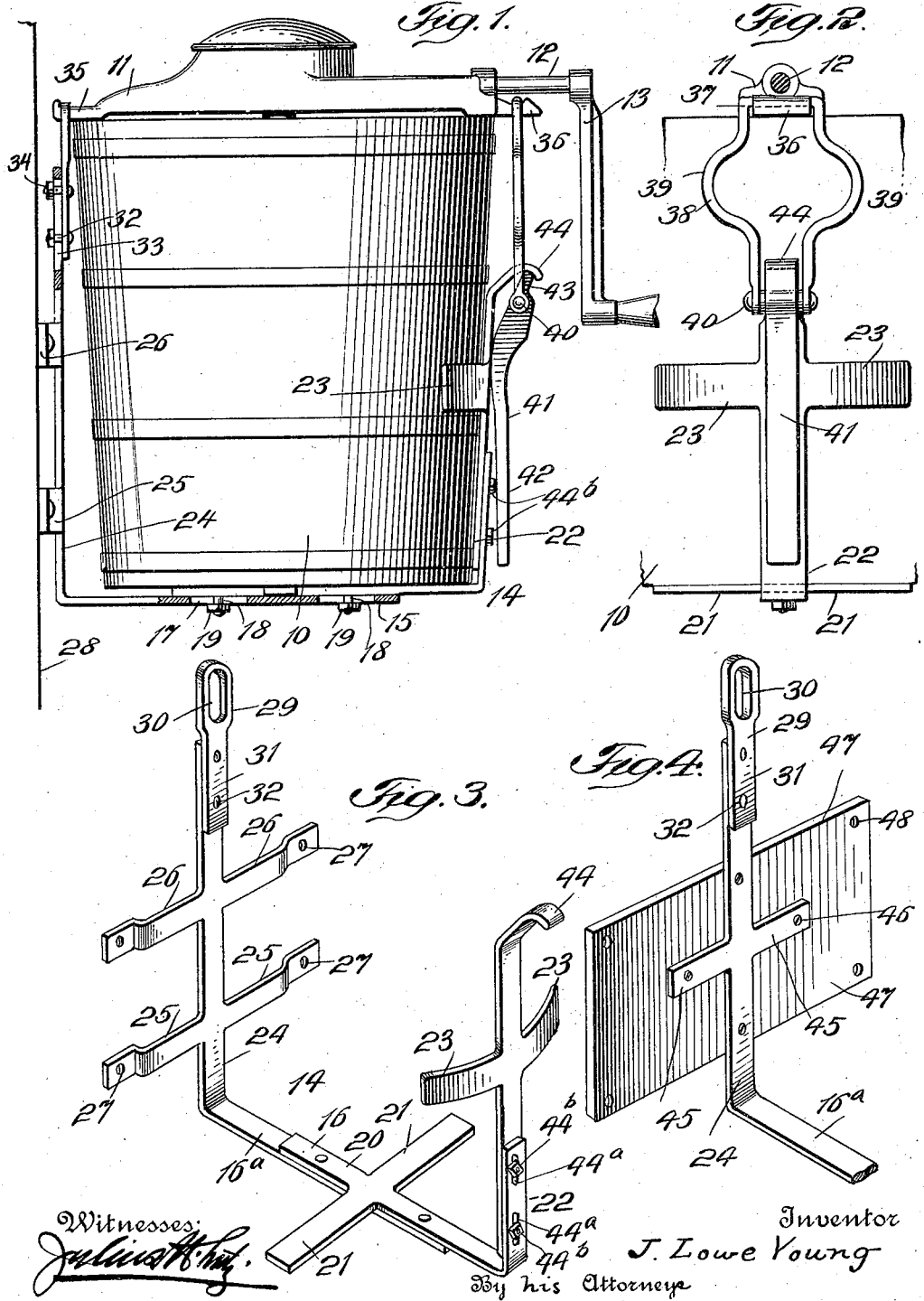

JACOB LOWE YOUNG, OF NEW ROCHELLE, NEW YORK.

STAND FOR ICE-CREAM FREEZERS.

1,179,061. Specification of Letters Patent. Patented Apr. 11, 1916.

Application filed September 24, 1915. Serial No. 52,402.

*To all whom it may concern:*

Be it known that I, JACOB LOWE YOUNG, a citizen of the United States, and a resident of New Rochelle, county of Westchester, and State of New York, have invented certain new and useful Improvements in Stands for Ice-Cream Freezers, of which the following is a full, clear, and exact description.

This invention relates more particularly to a stand or support for ice-cream freezers of a size suitable for household purposes.

In the manufacture of ice-cream for household purposes, it is desirable that some means be provided whereby the freezer may be properly supported and held so that one person may operate the same. Under ordinary conditions, the freezer is usually held by one person and the crank operated by another person, the former not always being an easy task.

One of the principal objects of the present invention is to overcome the objection referred to, and to provide a simple and efficient device which is adapted to hold and support in a convenient position the ordinary household ice-cream freezer so that the bucket as well as other parts may be held in such a way that the usual crank may be operated by a person without holding the bucket or other part of the freezer.

Another object of the invention is to provide a simple and efficient stand or support which is adapted to be held against a wall or other support convenient for operating purposes and which is adapted for use in connection with various kinds of tubs or other objects requiring to be held while certain parts or mechanisms thereof are rotated.

A further object of the invention is to provide a simple and efficient device which is adjustable so as to adapt the stand or support for freezers or other objects of different sizes.

With these and other objects in view, the invention will be hereinafter more particularly described, with reference to the accompanying drawings, which form a part of this application, and will then be pointed out in the claims at the end of the description.

In the drawings, Figure 1 is a side elevation, partly broken away and partly in section, of one form of device embodying my invention, showing the ice-cream freezer held in position for use. Fig. 2 is a fragmentary front elevation of the device with the operating crank shaft in section. Fig. 3 is a detail perspective view of the stand portion or member of the device; and Fig. 4 is a fragmentary perspective view of a stand showing a slightly different form of stand member.

The device has a bucket 10 and the usual freezer member 11, the latter having means to support a shaft 12 on the outer end of which is a crank 13 by which the can or receptacle within the bucket may be rotated. A stand or support member 14 has a base portion 15 on which the bucket 10 is adapted to rest. The base 15 comprises two members or parts 16 and 16ª which are adjustable relatively with respect to each other for buckets of different diameters. The member 16ª is provided with slots 17 through which bolts 18 are adapted to pass, and on the outer end of said bolts are nuts 19. The bolts 18 are held to the part 20 of the member 16ª, and when the two members are adjusted according to the diameter of the bucket the nuts 19 are adapted to hold the two members 16 and 16ª in their adjusted position. The member 16 is provided with outwardly extending arms, 21, serving as a better means to support the bucket 10, and with the part 20 is substantially cross-shaped in form. At the forward part of the portion 20 is an upright or standard 22 having its upper portion provided with outwardly extending curved arms 23 which partly span the body of the bucket 10. The rear portion of the base member 16ª has an upright or standard 24. Arms 25 extend from opposite sides of the upright or standard 24 and a second set of arms 26 also extends on opposite sides of said upright or standard 24. These arms 25 and 26 may be bent slightly inwardly and at their ends are provided with openings 27, and by means of lag screws or other securing means passing through said openings 27 serve to hold securely the stand to a wall 28 or other support.

To hold the bucket 10 of the freezer in position against all movement various means may be employed. As shown I provide a clip 29 in which is a slot 30. The clip 29 may have a stem portion 31, through which pass the bodies of bolts 32. The bolts 32 extend through a slot 33, and on the bolts 32 are nuts 34 by which the clip 29 may be held in an adjusted position to adapt different heights of buckets to be held to the stand or support member. The freezer member 11 has a hook portion 35 at its rear end which is adapted to extend through the slot 30, and at the forward end is also provided with a hook 36. This hook 36 is adapted to receive the upper end 37 of a bail 38. This bail 38 may have outwardly extending curved parts 39 and at its lower end is provided with a pivot bolt 40. On the bolt 40 is pivotally held a cam lever 41. This lever 41 has a handle portion 42 and a cam portion 43 which is adapted to engage under a lip or outwardly curved part 44 located at the upper end of the standard or upright 22.

It will be evident, when the freezer is in the position shown in Fig. 1, and the bail 38 placed over the hook 36 and the lever 41 moved to the position shown, that the member 11 with the bucket 10 will be forced toward the base 15 and rigidly held in this position, and as soon as the handle 41 is thrown out to release the cam part 43 from the lever 44, the clamping effect will be relieved and the bucket and member 11 released so that the freezer may be removed from said stand.

It will be further evident that in making the clip 29 or other part of the standard 24 adjustable, the upright 22 at the front of the device might also be made adjustable to compensate for different heights of freezers or other objects, the said upright in this case being in two parts and having bolts 44ª and slots 44ᵇ forming an adjustable connection as is the case with the members 16 and 16ª, or the clip 29 and standard 24.

In Fig. 4 instead of the sets of arms 25 and 26 a single set of arms 45 is provided which extend outwardly on opposite sides of the stand 24. These arms 45 are secured by screws 46 or otherwise to a board 47. The board 47 may be provided with openings 48 which are located in proper position for the ordinary lag screws so that the said board may be properly attached to the wall of a building in a position convenient for the crank 13 of the freezer to be operated.

Having thus described my invention, I claim as new and desire to secure by Letters Patent:—

1. A device of the character described, comprising a stand member having parts adjustable vertically and horizontally to adapt the device for use in connection with freezers of different sizes, a freezer member having a hook portion at the rear adapted to engage one part of the stand and having a hook portion at the front part thereof, and a bail and cam lever connection between the freezer member and a part of the stand member adapted to hold the freezer rigidly and removably to said stand member.

2. A device of the character described, comprising a stand member having a base portion provided with outwardly extending arms, a rear upright portion having outwardly extending arms arranged in sets and adapted to be secured to a support, a clip portion located at the upper end of the upright portion, a front upright portion having outwardly extending curved arms adapted partly to span the body of a tub or bucket and having an outwardly projecting cam lip portion at the upper end thereof, a cam lever adapted to engage said lip portion, and means whereby the bail and clip may engage a part of the tub to hold the same to the stand member.

3. A device of the character described, comprising a stand member having a base portion provided with outwardly extending arms a rear upright portion having outwardly extending arms and adapted to be secured to a support, said upright portion having a slot at the upper end thereof for the reception of a part of a freezer, a front upright portion having outwardly extending curved arms adapted partly to span the body of the freezer bucket and having an engaging portion at the upper end thereof, a bail adapted to engage a part of the freezer, and a cam lever adapted to engage said engaging portion to hold the freezer to the stand member.

4. A device of the character described, comprising a stand member having a base portion provided with outwardly extending arms, a rear upright portion having outwardly extending arms adapted to be secured to a support, a front upright portion having a lip portion at the upper end thereof, a bail, and a lever adapted to engage said lip portion to hold an object to the stand member.

5. A device of the character described, comprising a stand member, a freezer member having a part adapted to engage a portion of the stand member, a bail having a loop portion adapted to engage a part of the freezer member, and a lever for forcing the bail downwardly and having a portion thereof adapted to engage a portion of the stand member.

6. A device of the character described, comprising a stand member, a member having a part adapted to engage a rear portion of the stand member, a bail adapted to engage a part of said member at the front portion thereof, and a lever for forcing the bail downwardly and having a cam action against a portion of the stand member.

7. A device of the character described, comprising a stand member, a member having a part adapted to engage a portion of the stand member, a bail adapted to engage a part of said member, and means for forcing the bail downwardly and having a portion thereof adapted to engage a portion of the stand member.

This specification signed this twenty-first day of September A. D. 1915.

JACOB LOWE YOUNG.

Copies of this patent may be obtained for five cents each, by addressing the "Commissioner of Patents, Washington, D. C."